1897X
D. MELVILLE.
GAS LAMP.
Patented Mar. 18, 1813.
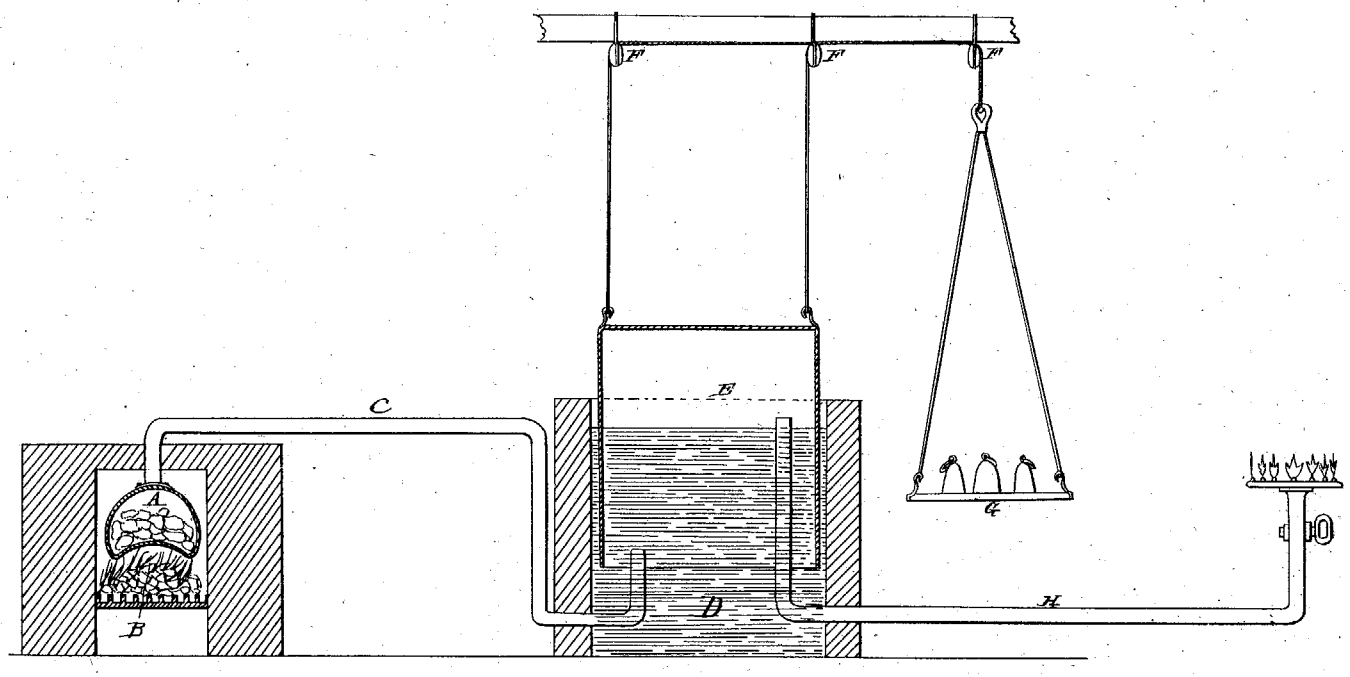
THE NORRIS PETERS CO., PHOTO-LITHO., WASHINGTON, D. C.

David Melville.

Letters Patent 1897X

The Schedule referred to in these Letters Patent and making part of the same containing a description in the words of the said David Melville himself of his improvement in the Gas Lamp.

The improved Gas Lamp, invented and improved by by the subscriber is an apparatus for separating the hydrogenous gas or inflamable air from the carbon, and less volatile ingredients of pit coal for the formation of gas light for the lighting of manufactories, mines, mills, streets, theatres, light houses and other buildings, in a more agreeable and less expensive & dangerous manner than has hitherto been done by any other method; all which objects he has found can be effected by an apparatus simple in its construction and easy in its management. The apparatus consists of a light cast iron retort set in a furnace, with a pipe leading to a pneumatic cistern filled with water, and a reservoir or gasometer, suspended in the cistern, by a rope or chain, leading over pullies or sheaves, to a scale containing weights; and pipes or tubes leading from the gasometer to the apartments &c where the lights are wanted.

The apparatus being filled the mode of operation is as follows. A quantity of pit coal is placed in the retort the door shut and luted tight. A strong heat being applied by means of a fire lighted in the furnace; hydrogenous gas or inflammable air will be driven out of the coal confined in the retort and forced through the water in the cistern by which it is purified, having passed through the water, it raises up the gasometer until it is filled when it may be reserved for occasional use.

By taking one or more weights off the scale the Gasometer will bear with so much the greater weight upon the volume of gas contained in it, which forces it through the pipes to any distance or in any direction to the burners or apertures where the lights are wanted; and by which the flames are made to burn with more or less force at pleasure. If all the weights should be taken off the scale, and the flames still not burn

1897X with sufficient force one or more weights may be placed on the Gasometer;
Instantly on the issuing of the gas from the apertures of the burners and
coming in contact with the oxygenous gas of the atmosphere as it will
take fire on the application of a taper and will continue to burn with
a brilliant flame without smell or smoke as long as there is any gas
in the Gasometer. The burners are furnished with keys by which each
flame may be regulated to give more or less light and the whole (be there
ever so many) may be regulated as to the size of the flame or they
may be instantaneously extinguished by a single key in the main pipe
or tube rd. Witnesses
W.C. John Ross Junr
W. Dean D. Melville (602 words (Patented 18 March 1813)

[illegible]